United States Patent
Kiriakopolos et al.

[11] Patent Number: 6,123,366
[45] Date of Patent: Sep. 26, 2000

[54] PIPE REINFORCING DEVICE

[76] Inventors: Ioannis Kiriakopolos; Ulla B. Kiriakopolos, both of 5930 Orchard La., Forestville, Calif. 95436

[21] Appl. No.: 09/348,950

[22] Filed: Jul. 7, 1999

Related U.S. Application Data

[62] Division of application No. 08/977,579, Nov. 25, 1997, abandoned
[60] Provisional application No. 60/040,863, Mar. 17, 1997.

[51] Int. Cl.[7] .......................................... F16L 3/00
[52] U.S. Cl. ........................... 285/61; 285/115; 285/179; 248/74.1
[58] Field of Search .................. 138/96 T, 109, 138/172, 177; 285/115, 114, 179, 61, 64, 180; 248/62, 74.1, 74.2

[56] References Cited

U.S. PATENT DOCUMENTS

| | | | |
|---|---|---|---|
| 1,011,612 | 12/1911 | Gordon | 285/114 X |
| 1,322,330 | 11/1919 | Neames | 138/109 X |
| 1,598,503 | 11/1926 | Plummer | 285/64 X |
| 2,465,495 | 3/1949 | Taliento | 285/114 X |
| 5,211,602 | 5/1993 | Holmgren | 285/114 X |
| 5,529,268 | 6/1996 | Wright | 248/74.1 X |
| 5,687,938 | 11/1997 | Bailey | 248/74.1 |
| 5,797,697 | 8/1998 | Keller | 248/74.1 X |

*Primary Examiner*—Lynne H. Browne
*Assistant Examiner*—Greg Binda
*Attorney, Agent, or Firm*—Jack Lo

[57] ABSTRACT

A pipe reinforcing device includes a tubular connecting member with a pair of internal threads at opposite ends thereof, and a pair of sleeves extending outwardly from the internal threads. The sleeves have a slightly larger inner diameter than the threads. Pipes are inserted into the sleeves, and screwed into the threads. The sleeves extend substantially beyond the external threads on the pipes and completely enclose them. When the pipes are deflected, stress on their external threads is relieved by the sleeves, so that the pipes are prevented from fracturing at the external threads. In a second embodiment, U-shaped sleeves are attached to the adjacent ends of a pair of pipes joined by a conventional connector. A connecting member is positioned against the pipes opposite the sleeves. The sleeves are secured to the connecting member by bolts. The sleeves and connecting member extend substantially beyond the external threads of the pipes and completely enclose them, so that they relieve the stress on the external threads when the pipes are deflected. The pipe reinforcing device thus provides a significant safety benefit in floods, earthquakes, or other events that cause pipe deflections.

1 Claim, 3 Drawing Sheets

PIPE REINFORCING DEVICE

CROSS REFERENCE TO RELATED APPLICATION

This is a division of application number 08/977,579, filed Nov. 25, 1997, now abandoned Nov. 25, 1997. The benefit of provisional application number 60/040,863, filed Mar. 17, 1997 Mar. 17, 1997, is also claimed.

BACKGROUND OF THE INVENTION

1. Field Of The Invention

This invention relates generally to pipe connectors.

2. Prior Art

As shown in FIG. 1, a typical prior art pipe connector comprises a curved tubular body 10 with internal threads that extend inwardly from rims 11 for connecting a pair of pipes 12. However, when positioning the end of a long pipe against a distant connector, aligning the pipe axially with the end of the connector is difficult, so that the pipe may not screw in. Further, even when the pipes are screwed in as far as possible, portions of their external threads 13 are still exposed. When a lateral force is applied to one or both pipes, which may happen during floods, earthquakes, or other events that cause pipe deflections, the exposed threads are pressure points where a fracture can easily occur as shown. If the pipes carry a combustible fluid, a fire or explosion may result. Although the internal threads in the connector may be extended inwardly to accommodate all the threads on the pipes, a short segment of thread will still be exposed, which is enough to cause a fracture.

OBJECTS OF THE INVENTION

Accordingly, objects of the present pipe reinforcing device are:

- to connect two pipes together;
- to prevent the pipes from fracturing at their external threads;
- to automatically align the pipes with the connector for easier connections; and
- to retrofit an already installed, prior art pipe connector without having to replace it.

Further objects of the present invention will become apparent from a consideration of the drawings and ensuing description.

BRIEF SUMMARY OF THE INVENTION

A pipe reinforcing device includes a tubular connecting member with a pair of internal threads at opposite ends thereof, and a pair of sleeves extending outwardly from the internal threads. The sleeves have a slightly larger inner diameter than the threads. Pipes are inserted into the sleeves, and screwed into the threads. The sleeves extend substantially beyond the external threads on the pipes and completely enclose them. When the pipes are deflected, stress on their external threads is relieved by the sleeves, so that the pipes are prevented from fracturing at the external threads. In a second embodiment, U-shaped sleeves are attached to the adjacent ends of a pair of pipes joined by a conventional connector. A connecting member is positioned against the pipes opposite the sleeves. The sleeves are secured to the connecting member by bolts. The sleeves and connecting member extend substantially beyond the external threads of the pipes and completely enclose them, so that they relieve the stress on the external threads when the pipes are deflected. The pipe reinforcing device thus provides a significant safety benefit in floods, earthquakes, or other events that cause pipe deflections.

DRAWING REFERENCE NUMERALS

| | |
|---|---|
| 10. Tubular Body | 11. Rims |
| 12. Pipes | 13. External Threads |
| 14. Connecting Member | 15. Open Ends |
| 16. Internal Threads | 17. Sleeves |
| 18. Reinforcing Beads | 19. Gusset |
| 20. Pipes | 21. External Threads |
| 22. U-Shaped Sleeves | 23. Connecting Member |
| 24. Pipes | 25. Connector |
| 26. Shoulders | 27. Rims |
| 28. Edges | 29. Notches |
| 30. Holes | 31. Holes |
| 32. Bolts | 33. External Threads |

DETAILED DESCRIPTION OF THE INVENTION

Figure 1:
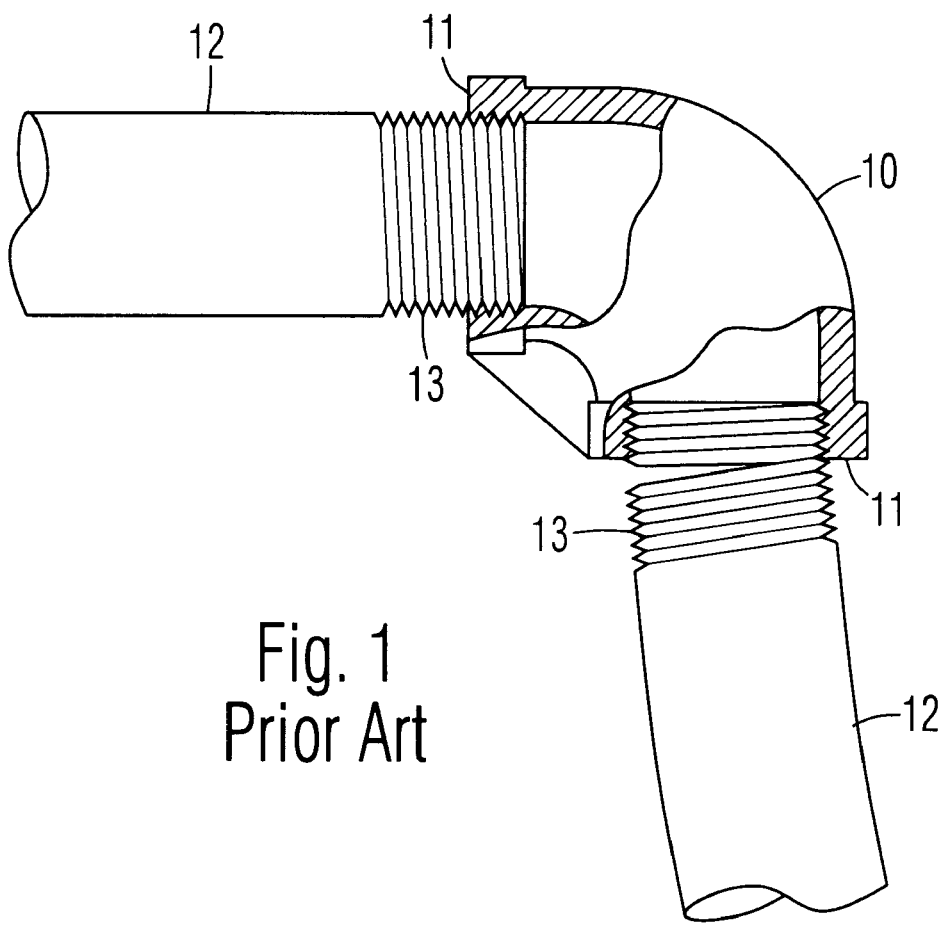
FIG. 1 is a partial cutaway side view of a prior art pipe connector.
Figure 2:
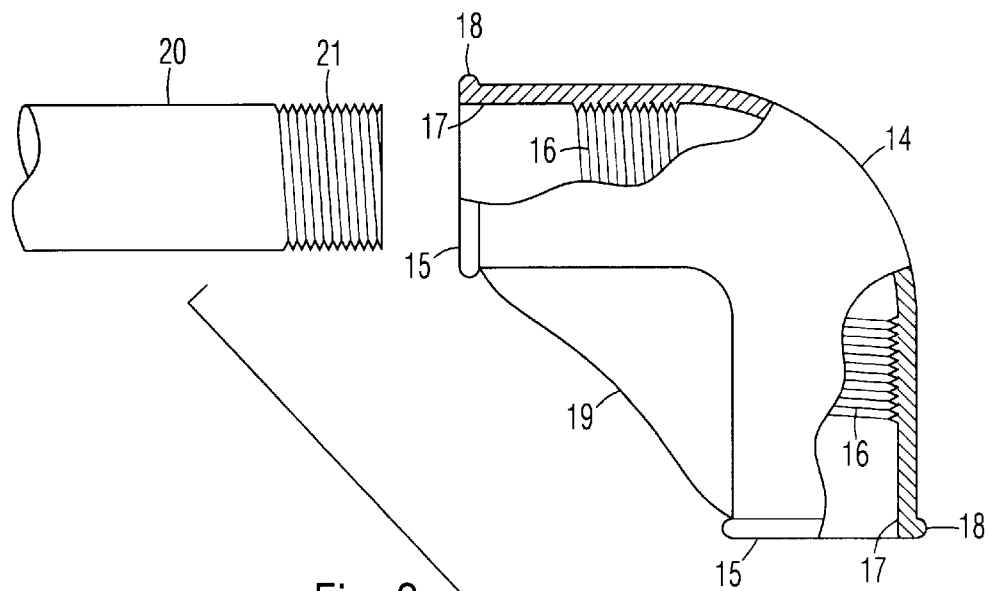
FIG. 2 is a partial cutaway side view of a first embodiment of the present pipe reinforcing device.

FIGS. 2–3:

A first embodiment of a pipe reinforcing device is shown in the partial cutaway side view in FIG. 2. It includes a tubular connecting member 14 with internal threads 16 at opposite ends thereof, and a pair of tubular sleeves 17 extending outwardly from internal threads 16. Sleeves 17 have a slightly larger internal diameter than threads 16. The internal surfaces of sleeves 17 are preferably smooth. A pair of reinforcing beads 18 surround open ends 15 of sleeves 17. A reinforcing gusset 19 spans the interior corner of tubular connecting member 14.

Figure 3:
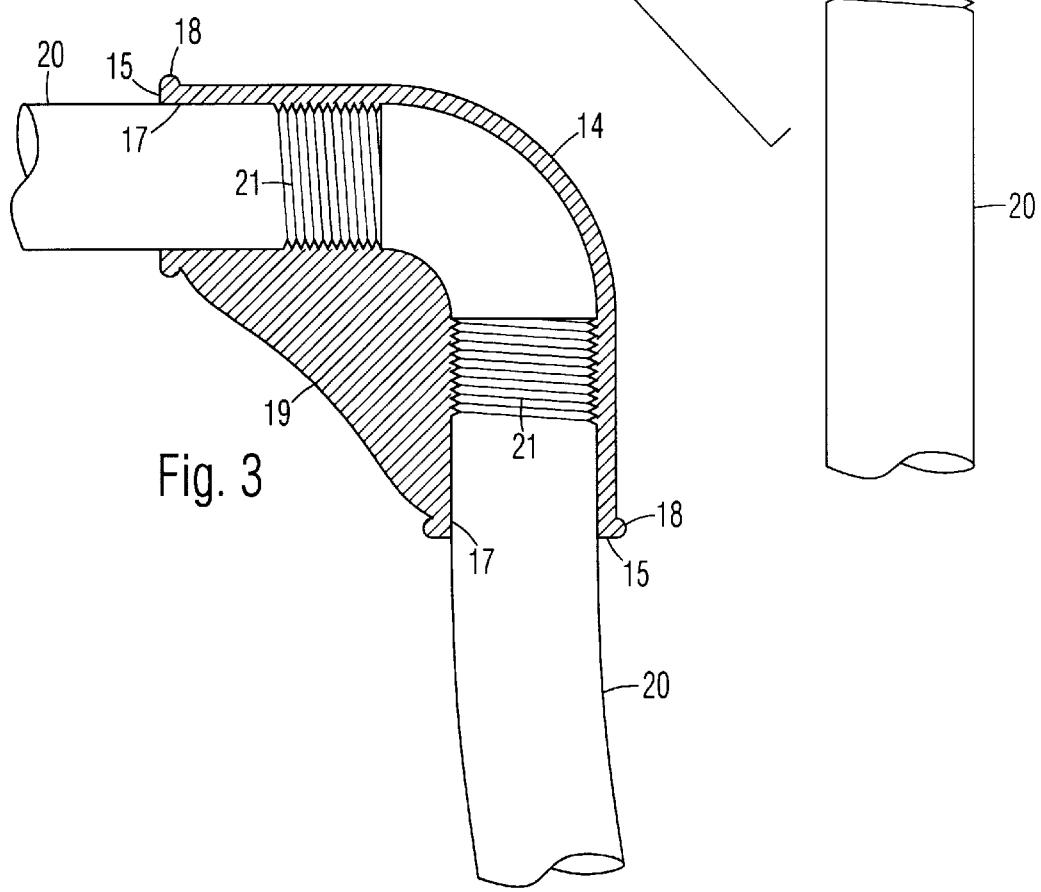
FIG. 3 is a partial cutaway side view of the pipe reinforcing device when a pipe is deflected.

The reinforcing device is used to connect a pair of pipes 20, which are inserted into sleeves 17. The smooth internal surfaces of sleeves 17 enable pipes 20 to slide in easily. Sleeves 17 align pipes 20 axially with threads 16, so that pipes 20 are easily screwed in, as shown in FIG. 3. Sleeves 17 extend substantially beyond external threads 21 of pipes 20, so that only the smooth portions of pipes 20 are exposed. When a pipe is deflected, it may bend as shown, but the stress on thread 21 is relieved by sleeve 17, so that pipe 20 is prevented from fracturing at thread 21. Therefore, a significant safety benefit is provided by the pipe reinforcing device in floods, earthquakes, or other events that cause pipe deflections.

Figures 4, 5:
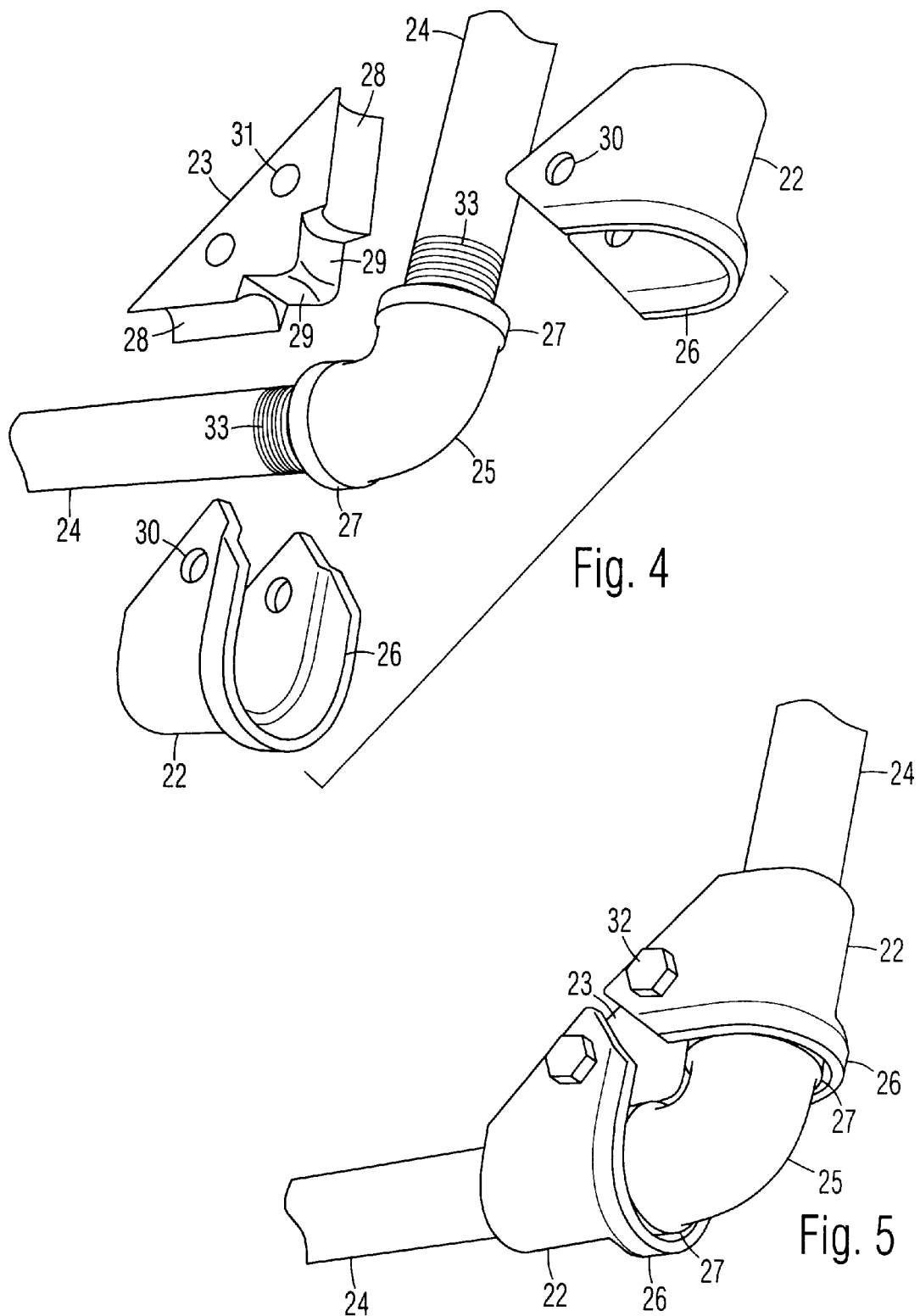
FIG. 4 is a side perspective exploded view of a second embodiment of the pipe reinforcing device.
FIG. 5 is a side perspective view of the second embodiment of the pipe reinforcing device attached to two pipes as a retrofit.

FIGS. 4–5:

A second embodiment of the pipe reinforcing device is shown in the side perspective view in FIG. 4. It includes a pair of U-shaped sleeves 22, and a connecting member 23. Sleeves 22 are for positioning around the adjacent ends of a pair of pipes 24 that are connected by a conventional connector 25. Sleeves 22 include shoulders 26 for engaging the enlarged rims 27 of connector 25. Connecting member 23 is for positioning against the interior comer between pipes 24. Connecting member 23 includes concave inner edges 28 for conforming to pipes 24, and notches 29 adjacent the corner between edges 28 for clearing rims 27 of connector 25. Holes 30 and 31 are arranged on sleeves 22 and connecting member 23.

To use, sleeves 22 are positioned around the outside of pipes 24, so that their shoulders 26 are engaged against rims 27 of connector 25, as shown in FIG. 5. Connecting member 23 is positioned against the interior corner between pipes 24, and between the arms of each sleeve. A pair of fasteners or bolts 32 are positioned through the holes, and tightened by nuts (not shown) on the other side. Sleeves 22 and connecting member 23 extend substantially beyond the external threads 33 (FIG. 4) of pipes 24, so that when one or both pipes are deflected, sleeves 22 and connecting member 23 relieve the stress on threads 33 and prevent a fracture threat.

SUMMARY AND SCOPE

Accordingly, a pipe reinforcing device is provided herein. In a first embodiment, it connects two pipes together. It prevents the pipes from fracturing at their external threads, so as to provide a significant safety benefit in floods, earthquakes, or other events that cause pipe deflections. It automatically aligns the pipes for easier connections. In a second embodiment, it can be retrofitted to a pair of pipes joined by a conventional pipe connector.

Although the above description is specific, it should not be considered as a limitation on the scope of the invention, but only as an example of the preferred embodiment. Many substitutes and variations are possible within the teachings of the invention. For example, in the first embodiment, the tubular connecting member can be curved at other angles for connecting pipes meeting at other angles, or it can be straight for joining axially aligned pipes. In a straight tubular connecting member, the two internal threads may be reduced to one positioned medially therein. The tubular connecting member may include one or more additional sections forming, e.g., a "T", a cross, etc., for joining three or more pipes together. Additional rings of reinforcing beads can be provided on the tubular connecting member. The reinforcing bead may be in a spiral. In the second embodiment, the connecting member may have inner edges meeting at other angles for attaching to pipes joined at corresponding angles. The connecting member may be straight for attaching to pipes axially connected together. The sleeves may be fixedly connected together as a single part resembling a U-shaped channel, which may be bent at different angles or straight. In both embodiments, the reinforcing device can be provided in different sizes for attaching to pipes of different sizes. The sleeve may be used for reinforcing a single pipe, for example, a pipe attached to a water heater, so that it is not limited to reinforcing the joint between two or more pipes. Therefore, the scope of the invention should be determined by the appended claims and their legal equivalents, not by the examples given.

We claim:

1. A pipe reinforcing device for reinforcing a plurality of pipes each having an end with an external thread, adjacent ends of said pipes being connected together by a connector with enlarged rims, said pipe reinforcing device comprising:

a plurality of U-shaped sleeves each for wrapping around one side of one of said pipes adjacent said end and extending substantially beyond said external threads; and a connecting member rigidly connected between said U-shaped sleeves, said connecting member being positioned between two arms of each of said U-shaped sleeves, said connecting member including a pair of edges arranged at an angle for engaging an interior corner between two of said pipes, said U-shaped sleeves for relieving stress on the external threads when said pipes are deflected, so as to prevent said pipes from fracturing at the external threads;

wherein said edges of said connecting member are concave for conforming to said pipes.

* * * * *